United States Patent
Maeda et al.

(10) Patent No.: US 6,432,323 B1
(45) Date of Patent: Aug. 13, 2002

(54) LIQUID CRYSTAL POLYESTER RESIN COMPOSITION AND MOLDED ARTICLE

(75) Inventors: Mituo Maeda, Tsukuba; Hiroshi Nakamura, Tsuchiura, both of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/568,034

(22) Filed: May 10, 2000

(30) Foreign Application Priority Data

May 13, 1999 (JP) .......................................... 11-132574

(51) Int. Cl.⁷ .......................... C09K 10/38; C08K 3/04; B32B 27/12
(52) U.S. Cl. ................. 252/299.01; 524/495; 428/297.4
(58) Field of Search ....................... 252/299.01, 299.05; 524/495, 601, 604, 605; 428/297.4

(56) References Cited

U.S. PATENT DOCUMENTS

| | | | |
|---|---|---|---|
| 4,161,470 A | 7/1979 | Calundann | 524/599 |
| 4,417,020 A | 11/1983 | Bailey et al. | 524/502 |
| 4,429,078 A | 1/1984 | Cogswell et al. | 525/165 |
| 4,803,235 A | 2/1989 | Okada | 524/494 |
| 5,244,975 A | 9/1993 | Asai et al. | 525/189 |
| 5,308,913 A | 5/1994 | Asai et al. | 524/546 |
| 5,428,100 A * | 6/1995 | Asai et al. | 524/496 |
| 6,346,568 B1 * | 2/2002 | Maeda et al. | 524/495 |

FOREIGN PATENT DOCUMENTS

| | | |
|---|---|---|
| JP | 4747870 | 12/1972 |
| JP | 633888 B2 | 1/1988 |

* cited by examiner

*Primary Examiner*—Shean C. Wu
(74) *Attorney, Agent, or Firm*—Birch, Stewart, Kolasch & Birch, LLP

(57) ABSTRACT

Provided is a liquid crystal polyester resin composition comprising a liquid crystal polyester resin and surface-treated carbon fiber with an urethane resin, wherein the amount of an urethane resin on the carbon fiber is from 0.5 to 5% by weight.

The liquid crystal polyester resin composition and the molded article obtained by using the composition of the present invention have excellent mechanical property and heat-resistance, particularly, solder-resistance, and are extremely useful as heat-resistant materials mainly for such as electric and electronic parts.

8 Claims, No Drawings

LIQUID CRYSTAL POLYESTER RESIN COMPOSITION AND MOLDED ARTICLE

BACKGROUND OF THE INVENTION

1. Field of the Invention

The present invention relates to a liquid crystal polyester resin composition. More specifically, the present invention relates to a liquid crystal polyester resin composition which is prepared by compounding carbon fiber which has been surface-treated with an urethane resin.

2. Description of the Related Art

A liquid crystal polyester resin (hereinafter, referred to as liquid crystal polyester) which manifests liquid crystal property in melting is excellent in heat-resistance, and is excellent in flowability, namely processability in melting, therefore, the liquid crystal polyester is used, as a molding material.which can provide precise molding, in various fields typically including electric and electronic fields. Particularly, a resin composition obtained by filling a fibrous reinforcing material such as carbon fiber or the like which has been surface-treated with an urethane resin, into a liquid crystal polyester resin is a material suitable for electric and electronic parts having thin parts or complicated forms.

However, since this resin composition has a high processing temperature, there may sometimes occur deterioration and decomposition of the resin composition due to heat, further, generation of a decomposed gas, for example, in a melt-extrusion for obtaining a resin composition in the form of pellets to be subjected to injection molding, or in a injection-molding process of a resin composition. Since a part of deteriorated materials such as gasses and the like in processing is embedded in a molded article, when the molded article is used as parts, various problems, for example, blister due to generation of a gas in a solder process, may occur.

SUMMARY OF THE INVENTION

The object of the present invention is to solve the above-described problems and provide a carbon fiber-compounded liquid crystal polyester resin composition having excellent mechanical property and heat-resistance, particularly, soldering resistance, and a molded article obtained by using the same.

That is, the present inventions is a liquid crystal polyester resin composition comprising a liquid crystal polyester resin and surface-treated carbon fiber with an urethane resin, wherein the amount of an urethane resin on the carbon fiber is from 0.5 to 5% by weight, and a molded article obtained by using the same.

The liquid crystal polyester resin composition of the invention can be prepared by compounding carbon fiber which has been surface-treated with an urethane resin in an amount of from 0.5 to 5% by weight, into a liquid crystal polyester resin.

DETAILED DESCRIPTION OF THE INVENTION

As the liquid crystal polyester resin to be used in the present invention, exemplified are:

(1) Polyesters composed of a combination of an aromatic dicarboxylic acid, aromatic diol and aromatic. hydroxycarboxylic acid, (2) Polyesters composed of different aromatic hydroxycarboxylic acid, (3) Polyesters composed of a combination of an aromatic dicarboxylic acid and aromatic diol, (4) Polyesters obtained by reacting a polyester such as polyethylene terephthalate and the like with an aromatic hydroxycarboxylic acid, and the like, and those forming isotropic melted bodies at temperatures of not more than 400° C. are preferable from the standpoint of molding processing, and the like. Further, instead of the above-described aromatic dicarboxylic acid, aromatic diol and aromatic hydroxycarboxylic acid, ester-forming derivatives thereof may also be used As the repeating structure unit of the liquid crystal polyester include, the following structure units may be exemplified.

Repeating structure units derived from aromatic hydroxycarboxylic acids:

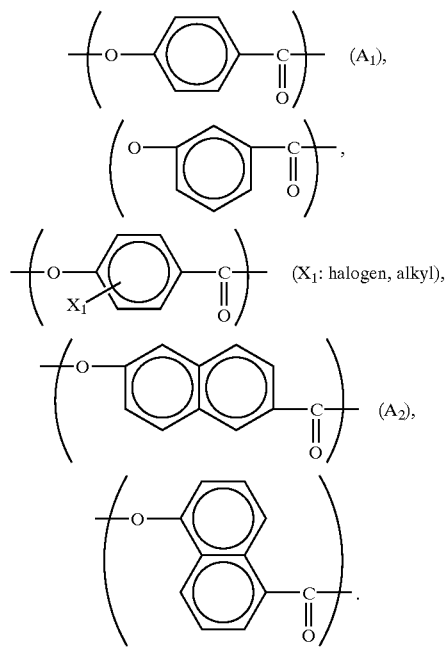

Repeating structure. units derived from aromatic dicarboxylic acids:

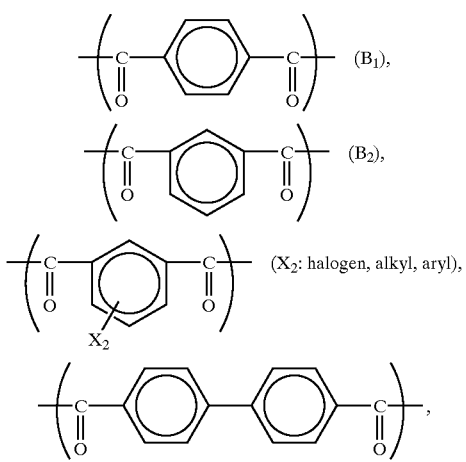

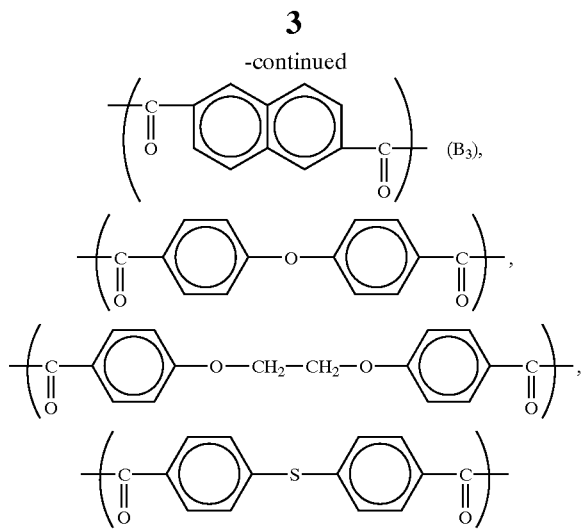

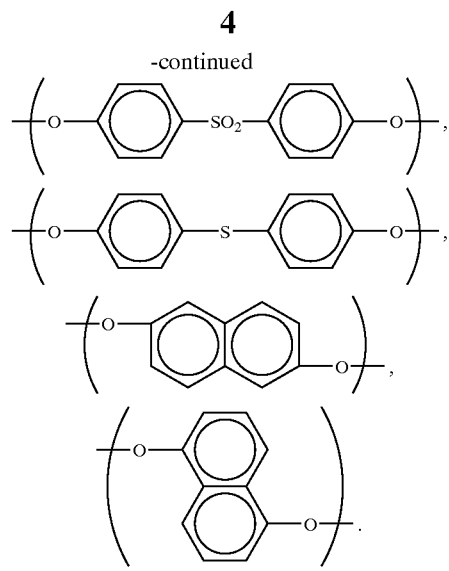

Repeating structure units derived from aromatic diols:

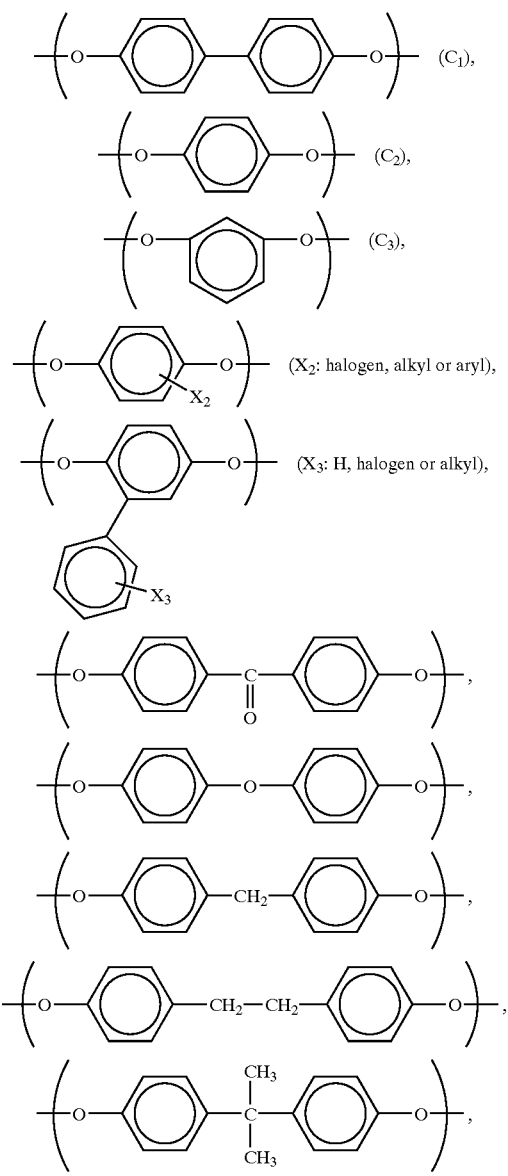

In the definition of the above substituents $X_1$ to $X_3$, "H" is a hydrogen atom, "alkyl" is preferably an alkyl group having 1 to 10 carbon atoms, and "aryl" is preferably an aryl group having 6 to 20 carbon atoms.

The liquid crystal polyester which is particularly preferable from the standpoint of balance between heat-resistance, mechanical property and processability is a liquid crystal polyester resin containing a repeating structure unit represented by $(A_1)$ in an amount of at least 30 mol. %. Specifically, those having repeating structure units as shown in the following (a) to (f) are preferable:

(a) a combination of repeating unit $(A_1)$, together with repeating unit $(B_1)$ either alone or together with repeating unit $(B_2)$, and also with repeating unit $(C_1)$ (b) a combination of repeating units $(A_1)$ and $(A_2)$ (c) a combination of repeating units $(A_1)$ and $(A_2)$, together with repeating unit $(B_1)$ either alone or together with repeating unit $(B_2)$, and also with. repeating unit $(C_1)$ (d) a combination of. repeating unit $(A_1)$, together with repeating units $(B_1)$ and $(B_3)$ either alone or together with repeating unit $(B_2)$, and also with repeating unit $(C_1)$ (e) a combination of repeating unit $(A_1)$, together with repeating unit $(B_1)$ either alone or together with repeating unit $(B_2)$, and also with repeating units $(C_1)$ and $(C_3)$ (f) a combination of repeating units $(A_1)$ and $(A_2)$, together with repeating units $(B_1)$ and $(C_2)$.

Known methods can be adopted for preparing liquid crystal polyester resins used in the present invention. For example, liquid crystal polyester resins of (a) and (b) are described in Japanese Patent Kokoku Publication (JP-B) Nos. 47-47870, 63-3888, and the like.

The carbon fiber used in the present invention is a fibrous substance wherein usually 90% or more of the chemical composition is composed of carbon fiber, and polyacrylonitrile, pitch, regenerated cellulose and the like can be used as the raw material thereof. Those obtained by carbonization treatment at 1000 to 2000° C. of a fibrous precursor which is obtained by spinning using these raw materials, or those obtained by graphitization treatment at 2000 to 3000° C. are usually used. As the carbon fiber, those of which surface has been activated by a method such as anodic oxidation and the like can be used.

The surface treatment of carbon fiber with an urethane resin means coating treatment of a part or all of the surface of carbon fiber with an un-cured or cured urethane resin, as well as sizing treatment of carbon fiber. The surface treatment contributes to handling property of carbon fiber, affinity with a liquid crystal polyester resin, and the like.

For the surface treatment of carbon fiber with an urethane resin, there is usually a procedure in which an urethane resin is made into an emulsion with an anionic, cationic or nonionic surfactant, a carbon fiber bundle is immersed into the emulsion, and moisture is removed by drying. If necessary, the urethane resin may sometimes be cured by heating.

As the un-cured urethane resin, an isocyanate can be used singly or a mixed solution of an isocyanate and a polyol can be used. If necessary, a catalyst such as an amine and the like may also be contained. Further, a part of the un-cured urethane resin may also be cured. Examples of the isocyanate include tolylene diisocyanate (TDI), diphenylmethane diisocyanate (MDI), naphthalene diisocyanate (NDI) and the like, and examples of the polyol include various polyether polyols, polyester polyols and the like.

In the present invention, the amount of an urethane resin in carbon fiber which has been surface-treatment with an urethane resin is from 0.5 to 5.0% by weight, preferably from 1.0 to 3.0% by weight. The amount of an urethane resin can be measured by reduction in weight in solution-removing or decomposition-removing an urethane resin from carbon fiber which has been surface-treated with an urethane resin. When the amount of an urethane resin is less than 0.5% by weight, the surface treatment of carbon fiber is insufficient, handling property is poor, and compounding into a liquid crystal polyester resin becomes difficult, undesirably. On the other hand, when the amount of an urethane resin is over 5.0% by weight, generation of a decomposed gas due to deterioration and decomposition by heating occurs sometimes, and heat-stability, and the like of a resin composition are affected, undesirably.

The number-average fiber diameter of carbon fiber used in the present invention is preferably from 1 to 30 μm and further preferably from 5 to 15 μm. When the number-average fiber diameter is less than 1 μm, surface treatment of carbon fiber may become insufficient, and handling and compounding into a liquid crystal polyester resin become difficult, sometimes. On the other hand, when the number-average fiber diameter is over 30 μm, take-up property of a strand may become unstable in melt-granulating a resin composition, undesirably.

The number-average fiber length of the carbon fiber is preferably from 25 to 6000 μm, and further preferably from 30 to 3000 μm. When the number-average fiber length is shorter than 25 μm, reinforcing effect by carbon fiber decreases, sometimes. When the number-average fiber length is longer than 6000 μm, take-up property of a strand in melt-granulating of a composition becomes unstable, and further, the surface condition of a product molded from the resulted resin composition deteriorates, sometimes.

In the resin composition of the present invention, the compounding amount of carbon fiber which has been surface-treated with an urethane resin is preferably from 5 to 100 parts by weight, more preferably from 10 to 70 parts by weight based on 100 parts by weight of a liquid crystal polyester resin. When the compounding amount is over 100 parts by weight, feeding property to screw during pelletization may deteriorate, and simultaneously, plasticization in molding processing becomes unstable, further, the mechanical strength of a molded article decreases and appearance thereof deteriorates, sometimes. On the other hand, when the compounding amount is less than 5 parts by weight, the mechanical strength of a molded article may become insufficient, undesirably.

For compounding raw materials to obtain the resin composition of the present invention, there is a general procedure in which a liquid crystal polyester resin, carbon fiber which has been surface-treated with an urethane resin, and if necessary, an inorganic filler, releasing agent, heat stabilizer and the like are mixed by using a Henschel mixer, tumbler or the like, then, the mixture is melt-kneaded using an extruder. For the melt-kneading, all raw materials may be mixed in one time before being fed to an extruder, or if necessary, raw materials like reinforcing materials such as carbon fiber or the like, and inorganic fillers, and the like may be fed, separately from raw materials mainly composed of a resin. In the present invention, a small amount of other fillers may be previously added if necessary, in addition to carbon fiber, to a liquid crystal polyester resin. Examples of the filler include fibrous or needle like reinforcing materials such as glass fiber, silica alumina fiber, wollastonite, potassium titanate whisker, aluminum borate whisker, titanium oxide whisker and the like; inorganic fillers such as calcium carbonate, dolomite, talc, mica, clay, glass bead and the like, as well as other materials, and one or more of them can be used.

One or more of usual additives such as coloring agents such as dye, pigment and the like; antioxidants; heat stabilizers; ultraviolet absorbers; antistatic agents; surfactants and the like can be added to a liquid crystal polyester resin used in the present invention.

Further, in the present invention, in addition to a liquid crystal polyester resin, a small amount of other thermoplastic resins, for example, polyamide, polyester, polyphenylene sulfide, polyether ketone, polycarbonate, polyphenylene ether and modified substances thereof, polysulfone, polyether sulfone, polyether imide and the like, or a small amount of thermosetting resin, for example, phenol resins, epoxy resins, polyimide resins and the like can be added, and one or more of them can be used.

The molded article of the present invention is prepared by using the liquid crystal polyester resin composition of the present invention, and obtained by molding the liquid crystal polyester resin composition by a known method. As this molding method, an injection molding method, compression molding method, extrusion molding method, hollow molding method and the like are listed, and the injection molding method is preferable. Use of parts and members molded from the resin composition of the present invention includes: electric and electronic parts such as connector, socket, relay parts, coil bobbin, light pick up vibrator, printed wiring board, computer-related parts and the like; semiconductor production process-related parts such as IC tray, wafer carrier and the like; domestic electric appliance parts such as VTR, television, iron, air conditioner, stereo, cleaner, refrigerator, rice cooker, illumination instruments and the like; illumination instrument parts such as lamp reflector, lamp holder and the like; audio product parts such as compact disk, laser disk, speaker and the like; communication instrument parts such as light cable ferrule, telephone parts, facsimile parts, modem and the like; copy machine-related parts such as separation claw, heater holder and the like; machine parts such as impeller, fan, toothed wheel, gear, bearing, motor parts and motor case, and the like; automobile parts such as mechanical parts for automobile, engine parts, inner parts of engine room, electrical equipment, interior parts and the like; cooking appliances such as microwave cooking pan, heat-resistant dish and the like; building raw materials of materials for construction and building such as heat-insulation and sound-insulation materials like flooring material, wall material and the like, supporting materials like beam, pillar and the like, roof materials and the like; airplane parts, space ship parts, materials of radiation facility such as nuclear reactor and the like, materials of marine facility, washing jig, parts of optical instrument, valves, pipes, nozzles, filters, membrane, medical instruments parts and medical materials, parts of sensors, sanitary equipment, sport goods, leisure goods, and the like.

EXAMPLES

Examples of the present invention include, but are not limited to, the following embodiments. In the examples, of superiority/inferiority determination of granulating property, and injection molded articles were conducted according to the following methods.

(1) Granulation Stability

Manner of breakage of an extruded strand and stability of granulation, in conducting granulation at a cylinder temperature of 340° C. using a twin-screw extruder "PCM-30 type, manufactured by Ikegai Iron Works, Ltd.", were evaluated.

(2) Tensile Strength

ASTM No. 4 dumbbell was used, and tensile strength was measured according to ASTM D638.

(3) Izod Impact Strength (No Notch)

A flexural test specimen of length 127 mm×width 12.7 mm×thickness 6.4 mm was bisected along the injection direction and used as a specimen, and Izod impact strength was measured according to ASTM D256.

(4) Deflection Temperature Under Load

A specimen of 12.7 mm×6.4 mm×127 mm was used, and deflection temperature under load was measured according to ASTM D648 at a load of 18.6 kg/cm$^2$.

(5) Soldering Resistance

A JIS K7113 No. (1/2) dumbbell specimen (thickness: 1.2 mm) was used, the test specimen was immersed in a solder bath heated to given temperature for 60 seconds, and presence or absence of blister and deformation on the specimen after removal was observed visually. The test was conducted while increasing the temperature of the solder bath gradually by 5° C. starting from 200° C.

Examples 1

100 parts by weight of a liquid crystal polyester resin which is composed of repeating structure units $A_1$, $B_1$, $B_2$ and $C_1$ and in which $A_1:B_1:B_2:C_1$ molar ratio is 60:15:5:20; and 66.7 parts by weight of a PAN-based carbon fiber (HTA-C6-US, manufactured by Toho Rayon Co.,Ltd., surface-treated with urethane resin in amount of 2% by weight, number average fiber length: 6 mm, number average fiber diameter:6 μm) were mixed in a tumbler, then, the mixture was granulated by a twin-screw extruder (PCM-30 type, manufactured by Ikegai Iron Works, Ltd.) at a cylinder temperature of 340° C., to obtain a pellet composed of a liquid crystal polyester resin composition. The resulted pellet was injection-molded by PS40E5ASE type injection molding machine manufactured by Nissei Plastic Co., Ltd. at a cylinder temperature of 35° C. and a mold temperature of 103° C., to mold a specimen for evaluation. The results are shown in Table 1.

Example 2

The same procedure as in Example 1 was conducted except that pitch-based carbon fiber (GPCS03JUE, manufactured by Nitto Boseki Co.,Ltd., surface-treated with urethane resin in amount of 2% by weight, number average fiber length: 6 mm, number average fiber diameter: 6 μm) was used instead of the surface-treated PAN-based carbon fiber in Example 1. The results are shown in Table 1.

Comparative Example 1

The same procedure as in Example 1 was conducted except that pitch-based carbon fiber (1810AS, manufactured by Sumika-Hercules Co., Ltd., surface-treated with polyacetal in amount of 5% by weight, number average fiber length: 6 mm, number average fiber diameter: 6 μm) was used instead of the surface-treated PAN-based carbon fiber in Example 1.

Comparative Example 2

The same procedure as in Example 1 was conducted except that pitch-based carbon fiber (HTA-C6-NRS, manufactured by Toho Rayon Co.,Ltd., surface-treated with modified polyamide resin in amount of 6% by weight, number average fiber length: 6 mm, number average fiber diameter: 6 μm) was used instead of the surface-treated PAN-based carbon fiber in Example 1.

Comparative Example 3

The same procedure as in Example 1 was conducted except that pitch-based carbon fiber (HTA-C6-S, manufactured by Toho Rayon Co.,Ltd., surface-treated with modified epoxy resin in amount of 5% by weight, number average fiber length: 6 mm, number average fiber diameter:6 μm) was used instead of the surface-treated PAN-based carbon fiber in Example 1.

TABLE 1

| | Carbon fiber which has been surface-treated with resin | | | Results of ability evaluation | | | | |
|---|---|---|---|---|---|---|---|---|
| | Kind of carbon fiber | Kind of resin | Amount of resin (% by weight) | Granulation stability[1] | Tensile strength (kg/cm$^2$) | Izod impact strength (kgcm/cm) | Deflection temperature under load (° C.) | Solder heat-resistance |
| Example 1 | PAN-based fiber | Urethane resin | 2 | ○ | 1550 | 24 | 273 | No problem at 280° C. |
| Example 2 | Pitch-based fiber | Urethane resin | 2 | ○ | 1510 | 34 | 283 | No problem at 280° C. |

TABLE 1-continued

| | Carbon fiber which has been surface-treated with resin | | | Results of ability evaluation | | | | |
|---|---|---|---|---|---|---|---|---|
| | Kind of carbon fiber | Kind of resin | Amount of resin (% by weight) | Granulation stability[1] | Tensile strength (kg/cm²) | Izod impact strength (kgcm/cm) | Deflection temperature under load (° C.) | Solder heat-resistance |
| Comparative example 1 | PAN-based fiber | Polyacetal | 5 | × | 1350 | 23 | 248 | Blister generation at 230° C. |
| Comparative example 2 | PAN-based fiber | Modified polyamide | 6 | × | 1290 | 18 | 252 | Blister generation at 230° C. |
| Comparative example 3 | PAN-based fiber | Modified epoxy | 5 | × | 1400 | 24 | 260 | Blister generation at 240° C. |

[1] ○ : Breakage of strand does not occur, and stable production is possible.
×: Breakage of strand occurs, and stable production is impossible.

The liquid crystal polyester resin composition and the molded article obtained by using the composition of the present invention have excellent mechanical property and heat-resistance, particularly, solder-resistance, and are extremely useful as heat-resistant materials mainly for such as electric and electronic parts.

What is claimed is:

1. A liquid crystal polyester resin composition comprising a liquid crystal polyester resin and surface-treated carbon fiber with an urethane resin, wherein the amount of an urethane resin on the carbon fiber is from 0.5 to 5% by weight.

2. A liquid crystal polyester resin composition according to claim 1, wherein said resin composition is prepared by compounding carbon fiber which has been surface-treated with an urethane resin into a liquid crystal polyester resin, wherein the amount of the urethane resin on the carbon fiber is from 0.5 to 5% by weight.

3. A liquid crystal polyester resin composition according to claim 1, wherein the amount of the surface-treated carbon fiber is from 5 to 100 parts by weight based on 100 parts by weight of the liquid crystal polyester resin.

4. A liquid crystal polyester resin composition according to claim 1, wherein the liquid crystal polyester resin contains a repeating structure unit represented by the formula $A_1$ in an amount of 30 mol % or more.

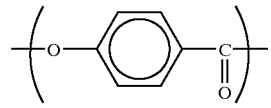

(A₁)

5. A molded article obtained by using the liquid crystal polyester resin composition of claim 1.

6. A liquid crystal polyester resin composition according to claim 2, wherein the amount of the surface-treated carbon fiber is from 5 to 100 parts by weight based on 100 parts by weight of the liquid crystal polyester resin.

7. A liquid crystal polyester resin composition according to claim 2, wherein the liquid crystal polyester resin contains a repeating structure unit represented by the formula $A_1$ in an amount of 30 mol % or more.

(A₁)

8. A molded article obtained by using the liquid crystal polyester resin composition of claim 2.

* * * * *